(12) United States Patent
Rivest et al.

(10) Patent No.: US 11,993,514 B2
(45) Date of Patent: May 28, 2024

(54) LIQUID METAL CONDENSATE CATALYZED HYDROCARBON PYROLYSIS

(71) Applicant: Palo Alto Research Center Incorporated, Palo Alto, CA (US)

(72) Inventors: Jessica Louis Baker Rivest, Palo Alto, CA (US); Divyaraj Desai, Hayward, CA (US); Dane Andrew Boysen, Anchorage, AK (US); Ashish V. Pattekar, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 256 days.

(21) Appl. No.: 17/022,435

(22) Filed: Sep. 16, 2020

(65) Prior Publication Data

US 2021/0170387 A1 Jun. 10, 2021

Related U.S. Application Data

(60) Provisional application No. 62/944,513, filed on Dec. 6, 2019.

(51) Int. Cl.
*C01B 3/26* (2006.01)
*B01D 1/00* (2006.01)
(Continued)

(52) U.S. Cl.
CPC .............. *C01B 3/26* (2013.01); *B01D 1/0023* (2013.01); *B01J 6/008* (2013.01); *B01J 19/0013* (2013.01);
(Continued)

(58) Field of Classification Search
CPC ... B01J 37/08; B01J 6/008; B01J 23/04; B01J 23/06; B01J 38/02; B01J 2219/00117;
(Continued)

(56) References Cited

U.S. PATENT DOCUMENTS

| 2,760,847 A | 8/1956 | Oblad et al. |
| 8,137,653 B1 | 3/2012 | Predtechensky et al. |
| 2019/0055173 A1 | 2/2019 | Desai et al. |

FOREIGN PATENT DOCUMENTS

| WO | 2019099795 A1 | 5/2019 | |
| WO | WO-2019099795 A1 * | 5/2019 | ............ B01J 10/005 |

* cited by examiner

*Primary Examiner* — Anthony J Zimmer
*Assistant Examiner* — Syed T Iqbal
(74) *Attorney, Agent, or Firm* — Vorys, Sater, Seymour and Pease, LLP

(57) ABSTRACT

Methods comprising: evaporating a catalyst source to produce a catalyst gas; condensing the catalyst gas to produce a catalyst vapor comprising catalyst droplets suspended in a gas phase; and contacting the catalyst vapor with a hydrocarbon gas to catalyze a decomposition reaction of the hydrocarbon gas into hydrogen gas and carbon. And, systems comprising: a catalyst source evaporator that provides a first stream to a reactor; a hydrocarbon source that provides a second stream to the reactor; a cooling column coupled to the reactor via a third stream comprising hydrogen, catalyst liquid, solid carbon, optionally catalyst gas, and optionally unreacted hydrocarbon gas such that the cooling column receives the third stream from the reactor; and wherein the cooling column has effluent streams that include (a) a fourth stream that comprises hydrogen and optionally catalyst gas and (b) a fifth stream that comprises catalyst liquid.

19 Claims, 5 Drawing Sheets

(51) Int. Cl.
*B01J 6/00* (2006.01)
*B01J 19/00* (2006.01)
*B01J 23/04* (2006.01)
*B01J 23/06* (2006.01)
*B01J 31/02* (2006.01)
*B01J 35/27* (2024.01)
*B01J 37/08* (2006.01)
*B01J 38/02* (2006.01)
*C01B 32/05* (2017.01)

(52) U.S. Cl.
CPC ............... *B01J 23/04* (2013.01); *B01J 23/06* (2013.01); *B01J 37/08* (2013.01); *B01J 38/02* (2013.01); *C01B 32/05* (2017.08); *B01J 31/0277* (2013.01); *B01J 35/27* (2024.01); *B01J 2219/0013* (2013.01); *C01B 2203/0277* (2013.01); *C01B 2203/04* (2013.01); *C01B 2203/06* (2013.01); *C01B 2203/0883* (2013.01); *C01B 2203/10* (2013.01); *C01B 2203/1005* (2013.01); *C01B 2203/1076* (2013.01); *C01B 2203/1241* (2013.01); *C01B 2203/1288* (2013.01)

(58) Field of Classification Search
CPC ............ B01J 2219/0013; B01J 19/0013; B01J 31/0209; B01J 35/12; B01J 23/8437; B01J 31/027; C01B 3/26; C01B 32/05; C01B 2203/0277; C01B 2203/06; C01B 2203/0883; C01B 2203/1005; C01B 2203/1076; C01B 2203/1241; C01B 2203/04; C01B 2203/10; C01B 2203/1235; Y02E 60/36
See application file for complete search history.

LIQUID METAL CONDENSATE CATALYZED HYDROCARBON PYROLYSIS

PRIORITY CLAIM

The present application claims priority to U.S. Provisional Patent Application No. 62/944,513 filed on Dec. 6, 2019.

STATEMENT REGARDING FEDERALLY SPONSORED RESEARCH AND DEVELOPMENT

This invention was made with Government support under Award No. DE-AR0001047 awarded by the Advanced Research Projects-Energy, US Department of Energy. The government has certain rights to this invention.

BACKGROUND

The present disclosure relates to hydrogen ($H_2$) production.

The U.S. and the broader international community continue to lack a scalable, $CO_2$-emission-free, energy-efficient, low-cost hydrogen production technology. Today, most domestic hydrogen is produced by steam methane reforming. The problem with steam methane reforming is that it produces one mole of $CO_2$ for every 4 moles of $H_2$, resulting in global steam methane reforming, emitting over 550 million tons of carbon dioxide annually or about 3% of global greenhouse gas emissions. While steam methane reforming with $CO_2$ capture and sequestration is being explored, there remain significant challenges to making it a commercially viable manner. In order to meet the growing demand for hydrogen and reduce the required global greenhouse gas emissions to prevent catastrophic global climate goals, the need for scalable, cost-competitive, carbon-free hydrogen production has never been greater.

The two leading approaches to produce $CO_2$ emission-free hydrogen are water electrolysis and hydrocarbon pyrolysis. However, both suffer from economical disadvantages at a fundamental level. For water electrolysis the feedstock is water and electricity, assuming an average U.S. grid electricity cost of 0.07 $/kWh, the theoretical minimum cost of hydrogen is 2.29 $/kg. For hydrocarbon pyrolysis (specifically methane pyrolysis), assuming a cost for natural gas of 3.00 $/MMBtu and that the gas also provides the reaction enthalpy, the theoretical minimum cost for hydrogen is 0.68 $/kg. By contrast, steam methane reforming has a stoichiometric advantage with a theoretical minimum cost of hydrogen production of 0.40 $/kg.

To produce hydrogen at a cost competitive with steam methane reforming, a methane pyrolysis process must exhibit high reactor throughput (or gas hourly space velocity or GHSV) which results in lower capital cost. In general, steam methane reforming has a reactor throughput of about 3,000 $h^{-1}$.

Researchers are currently developing hydrocarbon pyrolysis processes that use bubble column reactors, in which methane is bubbled through a molten catalyst whereby the hydrocarbon is decomposed (or pyrolyzed) at the liquid/gas interface to produce hydrogen gas and solid carbon. Unfortunately, the throughput of bubble column reactors is fundamentally limited by the inverse relationship between bubble diameter (catalytic surface area) and bubble rise time (space velocity). Based on the methane pyrolysis model developed by Upham et al., the maximum achievable space velocity for a bubble column reactor is about 400 $h^{-1}$, resulting in high capital costs and uncompetitive hydrogen production costs. Therefore, an alternative hydrocarbon pyrolysis approach with the potential for high space velocity is needed to be commercially viable.

SUMMARY OF INVENTION

The present application relates to methane pyrolysis using liquid metal condensation.

Some aspects of the present invention provide methods comprising: evaporating a catalyst source to produce a catalyst gas; condensing the catalyst gas to produce a catalyst vapor comprising catalyst droplets suspended in a gas phase; and contacting the catalyst vapor with a hydrocarbon gas so as to catalyze a decomposition reaction of the hydrocarbon gas into hydrogen gas and carbon.

Other aspects of the present invention provide systems comprising: a catalyst source evaporator coupled to a reactor via a first stream comprising catalyst gas such that the reactor receives the first stream from the catalyst source evaporator; a hydrocarbon source coupled to the reactor via a second stream comprising hydrocarbon gas such that the reactor receives the second stream from the hydrocarbon source; a cooling column coupled to the reactor via a third stream comprising hydrogen, catalyst liquid, solid carbon, optionally catalyst gas, and optionally unreacted hydrocarbon gas such that the cooling column receives the third stream from the reactor; and wherein the cooling column has effluent streams that include (a) a fourth stream that comprises hydrogen and optionally catalyst gas and (b) a fifth stream that comprises catalyst liquid.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
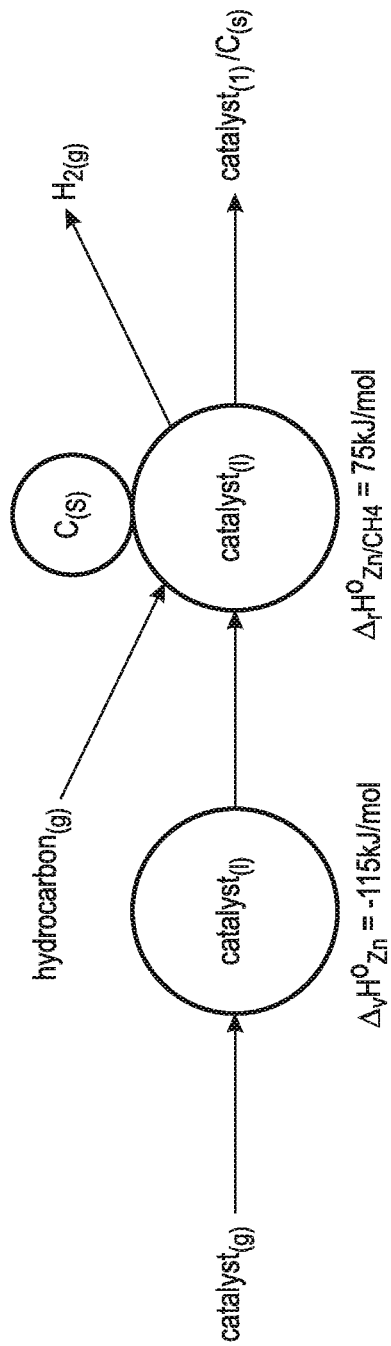
FIG. 1 illustrates a portion of the hydrocarbon pyrolysis approach described herein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients or steps and permit the presence of other ingredients or steps. However, such description should be construed as also describing compositions, mixtures, or processes as "consisting of" and "consisting essentially of" the enumerated ingredients or steps, which allows the presence of only the named ingredients or steps, along with any impurities that might result therefrom, and excludes other ingredients or steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, the term "condense," "condensing," and grammatical variations thereof refers to a phase change from gas to liquid but does not imply a percentage of the material undergoing said phase change. For example, a catalyst gas can be condensed into a catalyst vapor that comprises catalyst in the liquid phase (e.g., as droplets) and optionally still include catalyst in the gas phase.

As used herein, the term "catalyst vapor" refers to liquid catalyst droplets suspended in a gas that may or may not comprise catalyst in the gas phase. When describing a reaction with a catalyst vapor, the reaction may occur with the catalyst in the gas phase and/or the catalyst in the liquid phase.

Methods of the present disclosure use catalyst droplets condensed from a catalyst gas to catalyze hydrocarbon decomposition into hydrogen gas and carbon via a pyrolysis reaction. Without being limited by theory, the approach presented herein produces a catalyst gas (e.g., a metal gas like a zinc gas) that is condensed into a catalyst vapor comprising nanometer-sized catalyst droplets. Because of the small size of the droplets, the catalytic surface area is high. A hydrocarbon gas contacts the catalyst droplets, which catalyze the decomposition of the hydrocarbon to hydrogen gas and carbon.

FIG. 1 illustrates a portion of the hydrocarbon pyrolysis approach described herein. First, the catalyst gas [catalyst (g)] condenses into a droplet of catalyst liquid [catalyst(l)]. Condensation of the catalyst gas into liquid is exothermic (releases heat), having a negative change in enthalpy. As illustrated, the catalyst liquid then catalyzes decomposition of a hydrocarbon gas to form solid carbon and hydrogen. However, the illustration does not preclude the gas phase catalyst from also catalyzing the decomposition reaction.

The heat of reaction of hydrocarbon pyrolysis is positive, and therefore, endothermic (absorbs heat), having a positive change in enthalpy. Again, without being limited by theory, it is believed that catalyst, hydrocarbon, and reactor conditions (e.g., pressure and temperature) can be chosen so that the exothermic process of condensing the catalyst gas to catalyst liquid provides sufficient heat to drive the pyrolysis reaction. For example, the enthalpy of condensation for zinc (900° C. and 0.5 bar partial pressure) is about −115 kJ/mol energy, while the zinc-catalyzed pyrolysis of methane heat of the reaction is only about 75 kJ/mol energy. Therefore, the condensation portion of the method is able to provide heat to the pyrolysis reaction, which has the potential to simplify reactor thermal management and reduce the reactor cost because additional reactor heat input is substantially reduced.

Further, without limitation by theory, evaporation followed by condensation of the catalyst allows for the droplets in the catalyst vapor to be suspended in the gas phase with minimal interaction with nearby droplets similar to how water droplets in fog are suspended with minimal coalescence with nearby water droplets. In contrast, other droplet formation methods like spraying cause the droplets to have momentum, which facilitates rapid coalescence into larger droplets. Further, the methods of the present disclosure use the hydrocarbon gas as a suspending carrier fluid so as to move the catalyst vapor through a reaction zone with minimal to no turbulence that would facilitate catalyst droplet coalescence. Accordingly, a high density of catalyst droplets can be achieved using the condensation approach of the present disclosure, which coupled with the small size of the catalyst droplets further increases the catalytic surface area and overall process yield.

Figure 2:
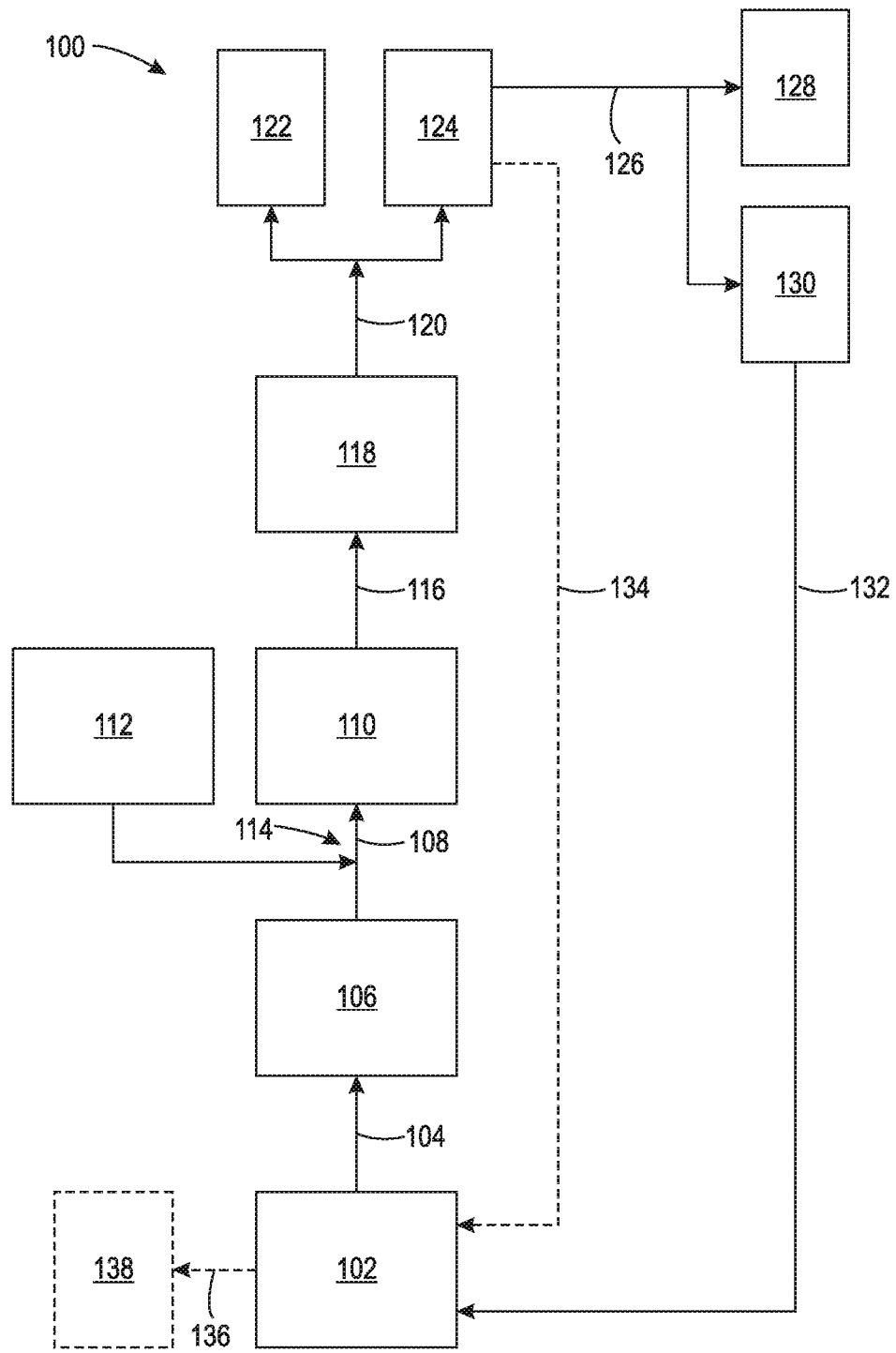
FIG. 2 illustrates a nonlimiting example of a hydrocarbon pyrolysis method of the present disclosure.

FIG. 2 illustrates a nonlimiting example of a hydrocarbon pyrolysis method 100 of the present disclosure. A catalyst source 102 is evaporated 104 to produce a catalyst gas 106. Optionally, a carrier gas inert to the decomposition reaction (e.g., argon, nitrogen, and the like, and any combination thereof) can be included in the evaporation.

Catalysts suitable for use in the methods described herein preferably have a boiling point of about 1,500° C. or less (or about 500° C. to about 1,500° C., or about 550° C. to about 1,400° C., or about 600° C. to about 1,200° C.). Examples of catalysts include, but are not limited to, metals, salts, ionic liquids, and the like. Examples of metal catalysts include, but are not limited to, cesium, selenium, rubidium, potassium, cadmium, sodium, zinc, polonium, tellurium, magnesium, ytterbium, lithium, strontium, thallium, calcium, and the like, and any combination thereof. Preferred metal catalysts include, but are not limited to, sodium, zinc, magnesium, and any combination thereof. Suitable salt catalysts may be salts comprising (a) alkali metal cation, alkaline earth metal cation, transition metal cation, or another metal cation and (b) an anion such as nitrate, citrate, halide, cyanide, and hydride. Specific examples of salt catalysts include, but are not limited to, sodium chloride, sodium bromide, sodium iodide, sodium sulfate, lithium chloride, lithium bromide, lithium iodide, lithium sulfate, potassium chloride, potassium bromide, potassium iodide, potassium fluoride, magnesium chloride, magnesium bromide, calcium iodide, zinc chloride, zinc bromide, and the like, and any combination thereof.

The temperature of the catalyst gas 106 is greater than the boiling point of the catalyst. Preferably, temperature of the catalyst gas 106 is about 5° C. to about 500° C. (or about 5° C. to about 50° C., or about 50° C. to about 100° C., or about 100° C. to about 250° C., or about 200° C. to about 500° C.) greater than the boiling point of the catalyst.

The catalyst gas 106 is then condensed 108 to form a catalyst vapor 110 comprising catalyst droplets. Condensation is achieved by lowering the temperature of the catalyst gas 106, which can be achieved by a variety of methods. For example, the reactor may be designed to have the catalyst gas 106 pass through a portion of the reactor that is sufficiently cooler than the catalyst gas 106 to produce the catalyst vapor 110. In another example, the catalyst gas 106 may be contacted 114 (e.g., mixed) with a hydrocarbon gas 112 that is at a low enough temperature to promote condensation 108 of the catalyst gas 106. In this example, the hydrocarbon gas 112 may be at about 5° C. to about 500° C. (or about 5° C. to about 50° C., or about 50° C. to about 100° C., or about 100° C. to about 250° C., or about 200° C. to about 500° C.) less than the boiling point of the catalyst.

The pressure of the catalyst gas 106 may affect the size of the catalyst droplets and density of the catalyst droplets, where a higher pressure may lead to a higher density of catalyst droplets. The pressure of the catalyst gas 106 may be about 1 bar to about 200 bars (or about 1 bar to about 25 bars, or about 10 bars to about 100 bars, or about 75 bars to about 200 bars).

The catalyst vapor 110 may comprise catalyst droplets having a diameter of about 5 nm to about 10,000 nm (or about 5 nm to about 150 nm, or about 10 nm to about 250 nm, or about 250 nm to about 1,000 nm, or about 1,000 nm to about 10,000 nm). Further, the catalyst vapor 110 may comprise catalyst droplets such that about 60 vol % or less (or about 0.1 vol % to about 60 vol %, or about 0.1 vol % to about 5 vol %, or about 0.1 vol % to about 10 vol %, or about 5 vol % to about 30 vol %, or about 25 vol % to about 50 vol %) of the catalyst vapor 110 is catalyst droplets (or catalyst liquid). Accordingly, a catalytic areal density of the catalyst vapor 110 may be as high as about 30,000 $m^2/m^3$ (or about 1,000 $m^2/m^3$ to about 30,000 $m^2/m^3$, or about 1,000 $m^2/m^3$ to about 10,000 $m^2/m^3$, or about 5,000 $m^2/m^3$ to about 20,000 $m^2/m^3$, or about 15,000 $m^2/m^3$ to about 30,000 $m^2/m^3$).

Having a high catalytic surface area may allow for a higher gas hourly space velocity, which may improve the potential for commercial viability of the methods described herein. The methods described herein may be performed with a gas hourly space velocity of about 1,000 $h^{-1}$ to about 100,000 $h^{-1}$ (or about 1,000 $h^{-1}$ to about 10,000 $h^{-1}$, or about 1,000 $h^{-1}$ to about 5,000 $h^{-1}$, or about 5,000 $h^{-1}$ to about 25,000 $h^{-1}$, or about 25,000 $h^{-1}$ to about 100,000 $h^{-1}$). Again, higher catalytic areal density contributes, at least in part, to a higher required gas hourly space velocity.

The catalyst vapor 110 and the hydrocarbon gas 112 react such that the catalyst (gas phase and/or liquid phase) cata- lyzes the decomposition reaction 116 of the hydrocarbon gas 112. FIG. 2 illustrates the hydrocarbon gas 112 and the catalyst (gas phase and/or liquid phase) being in contact during formation of the catalyst vapor 110. However, the hydrocarbon gas 112 may be introduced in the process at any time point before reaction 116 including at evaporation, during condensation, after condensation, and any combination thereof. For example, hydrocarbon gas 112 may be introduced to the process at multiple locations.

The hydrocarbon gas 112 may include a C1 to C20 alkane (linear, branched, and/or cyclic), a C1 to C20 alkene (linear, branched, and/or cyclic), a C1 to C20 alkyne (linear, branched, and/or cyclic), a C6 to C20 arene, and any combination thereof. For example, the hydrocarbon gas may comprise methane, ethane, and/or propane. Examples of hydrocarbon sources suitable for the hydrocarbon gas 112 include, but are not limited to, natural gas, liquefied petroleum gas, naphtha, diesel, light crude oil, heavy crude oil, oil sands, shale oil, wood, coal, biomass waste, organic waste, any distillate fraction thereof, and any combination thereof.

Generally, the catalyzed decomposition reaction 116 occurs with little to no reactive oxygen-containing compounds present so as to minimize the production of carbon dioxide. For example, the gas phase that the catalyst (gas phase and/or liquid phase) are exposed to preferably has less than about 1 vol % (or 0 vol % to about 1 vol %, or about 0.01 vol % to about 0.1 vol %) of oxygen-containing compounds cumulatively that are reactive in the decomposition reaction to produce carbon dioxide. Such oxygen-containing compounds include, but are not limited to, oxygen ($O_2$), carbon monoxide, water, and the like, and any combination thereof.

The catalyst vapor 118 that comprises the hydrogen, catalyst droplets, optionally catalyst gas, and carbon is further condensed to separate 120 the gas components 122 (e.g., hydrogen gas, optionally unreacted hydrocarbon gas, and optionally catalyst gas) from the solid/liquid mixture 124 comprising carbon and catalyst liquid.

The hydrogen in the gas components 122 can be further separated from the other components with a condenser and/or other separator, for example.

The solid carbon 128 can then be separated from the mixture 124 by known methods including mechanical separation (e.g., filtration, gravimetric, cyclonic, or the like) and/or thermal separation (e.g., via evaporation of the catalyst). For example, high vapor pressure catalysts like zinc make induction-heating methods that evaporate the catalyst from solid carbon more efficient. Further, such methods add heat to the catalyst, which reduces the additional heat needed for downstream evaporation if the catalyst is recycled back to the catalyst source 102.

The catalyst liquid 130 can then be recycled 132 back to the catalyst source 102. In alternative to the separation 126 before recycle 132 procedure, the mixture 124 can be recycled 134 to the catalyst source 102, and the carbon 138 can be separated 136 from the catalyst source 102.

Preferably, the catalyst is chosen so that (a) the carbon and catalyst do not react or form an alloy and (b) the carbon does not dissolve in the catalyst liquid, which allows for the carbon to be naturally in a solid phase (e.g., as slag, carbon fibers, graphene, diamond, glassy carbon, high-purity graphite, carbon nanotubes, carbon black, coke, activated charcoal, and the like and any combination thereof) that can be separated from the catalyst, which is in liquid form. Separation of the carbon 128, 138 from the mixture 124 or catalyst source 102 may be achieved by filtration, gravimetric separation, mechanical removal of floating solid carbon, cyclone separation, and the like, and any combination thereof.

Figure 3:
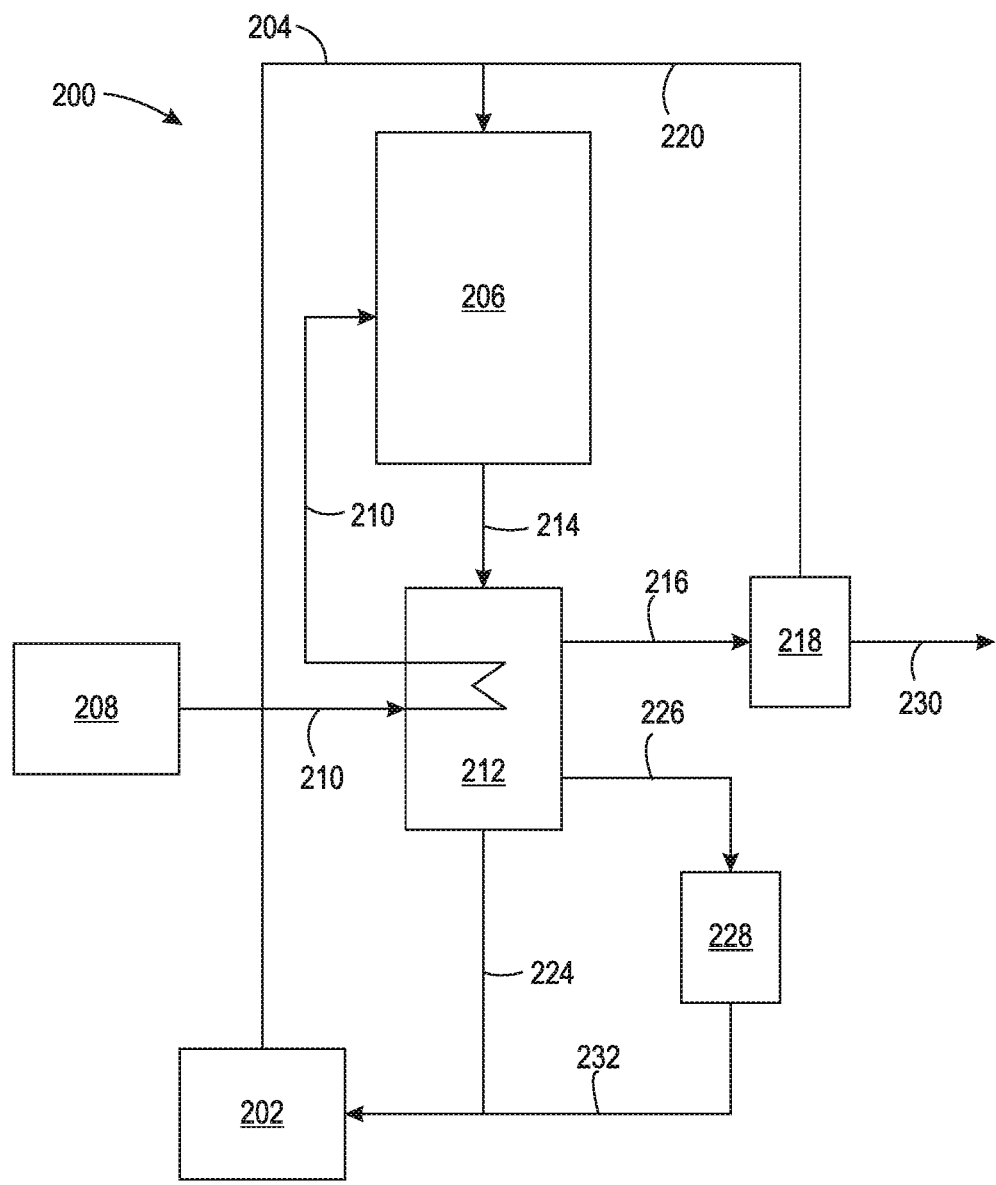
FIG. 3 illustrates a nonlimiting example system of the present disclosure.

FIG. 3 illustrates a nonlimiting example system 200 of the present disclosure.

As used herein, when describing components of a system that are coupled via streams, the coupling refers to fluids and/or solids being able to travel or be transported from one component to the other or between components. When traversing a coupling, the fluids and/or solids may travel through hardware like lines, pipes, pumps, conveyors, augers, extruders, connectors, heat exchangers, valves, mass flow controllers, and the like that ensure proper operation and safety measures when operating the system. While a single stream is used to describe the coupling, the stream may physically be implemented as multiple lines, pipes, and the like and include additional hardware along said stream. Further, as will be apparent to those skilled in the art, the system 200 illustrated in this nonlimiting example may include additional components like compressors, membranes, valves, flow meters, heat exchangers, traps, and the like for proper and safe operation of the methods described herein.

The system 200 includes a catalyst source evaporator 202 that is coupled to a reactor 206 via stream 204. The catalyst source evaporator 202 evaporates the catalyst source therein to produce the catalyst gas, which is conveyed to the reactor 206 via stream 204. Optionally, a carrier gas inert to the decomposition reaction (e.g., argon, nitrogen, and the like, and any combination thereof) can be included in the stream 204.

The system 200 also includes a hydrocarbon source 208 that is coupled to the reactor 206 via stream 210. As illustrated, the stream 210 passes through a cooling column 212, which heats the hydrocarbon in the stream 210. The hydrocarbon source 208 may be a pipeline, a tank, a truck tank, a distillation column, and the like. When the hydrocarbon from the hydrocarbon source 208 is introduced to the reactor 206, the hydrocarbon should be a hydrocarbon gas.

As illustrated, the hydrocarbon gas is introduced to the reactor 206 downstream of the catalyst gas. However, in alternate embodiments, the hydrocarbon gas can be introduced upstream of or in parallel with the catalyst gas.

As described in FIG. 2, within the reactor, the catalyst gas becomes a catalyst vapor and reacts with the hydrocarbon gas. The hydrocarbon gas should be introduced to the reactor in such a way to mitigate the formation of turbulence or eddies that would facilitate coalescence of the catalyst droplets in the catalyst vapor.

They hydrocarbon gas reactors with the catalyst (gas phase and/or liquid phase) to produce hydrogen and solid carbon. Therefore, the effluent stream 214 from the reactor 206 comprises hydrogen, catalyst (gas phase and/or liquid phase), and carbon solid and may further comprise unreacted hydrocarbon gas and/or reaction byproducts and/or carrier gas. Stream 214 fluidly couples the reactor to the cooling column 212. In the cooling column, the catalyst condenses into a liquid so as to separate the catalyst from the other gas phase components (hydrogen, unreacted hydrocarbon gas, reaction byproducts, and/or carrier gas) of the stream 214. However, some catalyst may remain in gas form. The catalyst liquid and solid carbon pool in the bottom of the cooling column 212 and the gas phase components exit the column 212 via stream 216. The stream 216 couples the cooling column 212 to a separator 218. The separator 218 separates the hydrogen from the other components to produce a hydrogen stream 222 and a stream 220 comprising the unreacted hydrocarbon, the reaction byproducts (when present), the carrier gas (when present), and/or catalyst gas (when present). In the separator 218, the catalyst gas, when present, may also condense to catalyst liquid, which would produce another stream (not illustrated) that could recycle back to the catalyst source evaporator 202 or another stream or component where catalyst liquid is present. The separator 218 may operate via condensation, filtration, and/or other suitable principles.

As illustrated, the stream 220 couples the separator 218 to the reactor 206 for further reaction of the components of the stream 220. However, recycling is not required in the systems and methods described herein.

The stream 222 comprising the hydrogen can be compressed, stored, and/or transported as desired. The stream 222 may comprise 80 vol % or greater (or 80 vol % to 100 vol %, or 90 vol % to 100 vol %, or 95 vol % to 99.5 vol %) hydrogen.

The catalyst liquid and solid carbon pooled in the bottom of the cooling column 212 are also separated. The method and/or system for separation of the catalyst liquid and solid carbon depends on the catalyst, the solubility and/or alloying of the catalyst with the carbon, the relative densities of the catalyst liquid and the solid carbon, and other factors. In the illustrated system 200, the solid carbon is not soluble in the catalyst liquid, and the solid carbon has a lower density than the catalyst liquid. Therefore, the solid carbon floats in the pooled catalyst liquid and solid carbon. So the top portion of the pooled material is extracted from the column 212 via stream 226. The stream 226 fluidly couples the cooling column 212 to a separator 228. The separator 228 may operate via evaporation, filtration, and/or other suitable principles to separate the catalyst from the solid carbon to produce a stream 230 comprising the solid carbon and a stream 232 comprising the catalyst.

As illustrated, the stream 232 couples the separator 228 to the catalyst source evaporator 202. However, recycling is not required in the systems and methods described herein. The stream 232 may comprise 80 vol % or greater (or 80 vol % to 100 vol %, or 90 vol % to 100 vol %, or 95 vol % to 99.5 vol %) catalyst liquid.

The stream 230 comprising the solid carbon can be stored and/or transported as desired. The stream 230 may comprise 80 vol % or greater (or 80 vol % to 100 vol %, or 90 vol % to 100 vol %, or 95 vol % to 99.5 vol %) solid carbon.

Referring back to the cooling column 212, the bottom of the pooled material is catalyst liquid having little to no solid carbon and, therefore, can be recycled back to the catalyst source evaporator 202 via stream 224. The stream 224 couples the cooling column 212 to the catalyst source evaporator 202. Again, recycling is not required, but is preferred, in the systems and methods described herein. The stream 224 may comprise 80 vol % or greater (or 80 vol % to 100 vol %, or 90 vol % to 100 vol %, or 95 vol % to 99.5 vol %) catalyst liquid.

Example Embodiments

Clause 1. A method comprising: evaporating a catalyst source to produce a catalyst gas; condensing the catalyst gas to produce a catalyst vapor comprising catalyst droplets suspended in a gas phase; and contacting the catalyst vapor with a hydrocarbon gas so as to catalyze a decomposition reaction of the hydrocarbon gas into hydrogen gas and carbon.

Clause 2. The method of Clause 1 further comprising: collecting the catalyst droplets to produce a mixture of the carbon and a catalyst liquid; and separating the carbon from the catalyst liquid.

Clause 3. The method of Clause 2, wherein separating the carbon from the catalyst liquid comprises: evaporating the catalyst liquid from the carbon.

Clause 4. The method of Clause 2 further comprising: recycling the catalyst liquid to the catalyst source for evaporation.

Clause 5. The method of Clause 1 or Clause 2 or Clause 3 or Clause 4 further comprising: condensing the catalyst droplets to produce a mixture of the carbon and a catalyst liquid; recycling the mixture to the catalyst source for evaporation; and separating the carbon from the catalyst source.

Clause 6. The method of Clause 1 or Clause 2 or Clause 3 or Clause 4 or Clause 5, wherein the catalyst gas before condensation is at a temperature of about 5° C. to about 500° C. greater than a boiling point of the catalyst.

Clause 7. The method of Clause 1 or Clause 2 or Clause 3 or Clause 4 or Clause 5 or Clause 6, wherein condensing the catalyst gas comprises: exposing the catalyst gas to the hydrocarbon gas, wherein the hydrocarbon gas is at a temperature below a boiling point of the catalyst.

Clause 8. The method of Clause 7, wherein the temperature of the hydrocarbon gas is about 5° C. to about 500° C. less than a boiling point of the catalyst.

Clause 9. The method of Clause 1 or Clause 2 or Clause 3 or Clause 4 or Clause 5 or Clause 6 or Clause 7 or Clause 8, wherein the catalyst is a metal.

Clause 10. The method of Clause 9, wherein the metal has a boiling point of 1,500° C. or less.

Clause 11. The method of Clause 9, wherein the metal comprises cesium, selenium, rubidium, potassium, cadmium, sodium, zinc, polonium, tellurium, magnesium, ytterbium, lithium, strontium, thallium, calcium, and any combination thereof.

Clause 12. The method of Clause 1 or Clause 2 or Clause 3 or Clause 4 or Clause 5 or Clause 6 or Clause 7 or Clause 8, wherein the catalyst is a salt.

Clause 13. The method of Clause 12, wherein the salt comprises a combination of (a) alkali metal cation, alkaline earth metal cation, transition metal cation, or another metal cation and (b) an anion selected from the group consisting of: nitrate, citrate, halide, cyanide, and hydride.

Clause 14. The method of Clause 1 or Clause 2 or Clause 3 or Clause 4 or Clause 5 or Clause 6 or Clause 7 or Clause 8, wherein the catalyst is an ionic liquid.

Clause 15. The method of Clause 1 or Clause 2 or Clause 3 or Clause 4 or Clause 5 or Clause 6 or Clause 7 or Clause 8 or Clause 9 or Clause 10 or Clause 11 or Clause 12 or Clause 13 or Clause 14, wherein the catalyst droplets have a diameter of about 5 nm to about 10,000 nm.

Clause 16. The method of Clause 1 or Clause 2 or Clause 3 or Clause 4 or Clause 5 or Clause 6 or Clause 7 or Clause 8 or Clause 9 or Clause 10 or Clause 11 or Clause 12 or Clause 13 or Clause 14 or Clause 15, wherein the catalyst droplets have a diameter of about 5 nm to about 150 nm.

Clause 17. The method of Clause 1 or Clause 2 or Clause 3 or Clause 4 or Clause 5 or Clause 6 or Clause 7 or Clause 8 or Clause 9 or Clause 10 or Clause 11 or Clause 12 or Clause 13 or Clause 14 or Clause 15 or Clause 16, wherein the catalyst vapor comprises the catalyst droplets such that about 60 vol % or less of the catalyst vapor is the catalyst droplets.

Clause 18. The method of Clause 1 or Clause 2 or Clause 3 or Clause 4 or Clause 5 or Clause 6 or Clause 7 or Clause 8 or Clause 9 or Clause 10 or Clause 11 or Clause 12 or Clause 13 or Clause 14 or Clause 15 or Clause 16 or Clause 17, wherein the catalyst vapor has a catalytic areal density of about 1,000 $m^2/m^3$ to about 30,000 $m^2/m^3$.

Clause 19. The method of Clause 1 or Clause 2 or Clause 3 or Clause 4 or Clause 5 or Clause 6 or Clause 7 or Clause 8 or Clause 9 or Clause 10 or Clause 11 or Clause 12 or Clause 13 or Clause 14 or Clause 15 or Clause 16 or Clause 17 or Clause 18 performed at a gas hourly space velocity of about 1,000 to about 100,000 $h^{-1}$.

Clause 20. The method of Clause 1 or Clause 2 or Clause 3 or Clause 4 or Clause 5 or Clause 6 or Clause 7 or Clause 8 or Clause 9 or Clause 10 or Clause 11 or Clause 12 or Clause 13 or Clause 14 or Clause 15 or Clause 16 or Clause 17 or Clause 18 or Clause 19, wherein the hydrocarbon gas has a source selected from the group consisting of: natural gas, liquefied petroleum gas, naphtha, diesel, light crude oil, heavy crude oil, oil sands, shale oil, wood, coal, biomass waste, and organic waste, any distillate fraction thereof, and any combination thereof.

Clause 21. The method of Clause 1 or Clause 2 or Clause 3 or Clause 4 or Clause 5 or Clause 6 or Clause 7 or Clause 8 or Clause 9 or Clause 10 or Clause 11 or Clause 12 or Clause 13 or Clause 14 or Clause 15 or Clause 16 or Clause 17 or Clause 18 or Clause 19 or Clause 20, wherein the hydrocarbon gas comprises one or more selected from the group consisting of: a C1 to C20 alkane, a C1 to C20 alkene, a C1 to C20 alkynes, and a C6 to C20 arene.

Clause 22. The method of Clause 1 or Clause 2 or Clause 3 or Clause 4 or Clause 5 or Clause 6 or Clause 7 or Clause 8 or Clause 9 or Clause 10 or Clause 11 or Clause 12 or Clause 13 or Clause 14 or Clause 15 or Clause 16 or Clause 17 or Clause 18 or Clause 19 or Clause 20 or Clause 21, wherein the gas phase comprises 0 vol % to about 1 vol % of oxygen-containing compounds that are reactive in the decomposition reaction to produce carbon dioxide.

Clause 23. A system comprising: a catalyst source evaporator coupled to a reactor via a first stream comprising catalyst gas such that the reactor receives the first stream from the catalyst source evaporator; a hydrocarbon source coupled to the reactor via a second stream comprising hydrocarbon gas such that the reactor receives the second stream from the hydrocarbon source; a cooling column coupled to the reactor via a third stream comprising hydrogen, catalyst liquid, solid carbon, optionally catalyst gas, and optionally unreacted hydrocarbon gas such that the cooling column receives the third stream from the reactor; and wherein the cooling column has effluent streams that include (a) a fourth stream that comprises hydrogen and optionally catalyst gas and (b) a fifth stream that comprises catalyst liquid.

Clause 24. The system of Clause 23 further comprising: a first separator coupled to the cooling column via the fourth stream such that the first separator receives the fourth stream from the cooling column; wherein the first separator has effluent streams that include (a) a sixth stream comprising 80 vol % or greater hydrogen and (b) a seventh stream comprising the unreacted hydrocarbon gas; and wherein the seventh stream couples the first separator to the reactor such that the reactor receives the seventh stream from the first separator.

Clause 25. The system of Clause 23 or Clause 24, wherein the fifth stream couples the cooling column to the catalyst source evaporator such that the catalyst source evaporator receives the fifth stream from the cooling column.

Clause 26. The system of Clause 23 or Clause 24 or Clause 25 further comprising: a second separator coupled to the cooling column via an eighth stream comprising the catalyst liquid and the solid carbon such that the second separator receives the eighth stream from the cooling column; wherein the second separator has effluent streams that include (a) a ninth stream comprising 80 vol % or greater of the solid carbon and (b) a tenth stream comprising 80 vol % or greater of the catalyst liquid; and wherein the seventh stream couples the first separator to the reactor such that the reactor receives the seventh stream from the first separator.

Clause 27. The system of Clause 26, wherein the second separator causes the catalyst liquid to evaporate.

Clause 28. The system of Clause 23 or Clause 24 or Clause 25 or Clause 26 or Clause 27, wherein the second stream passes via heat exchange through the cooling column.

Clause 29. A system comprising: a catalyst source evaporator that provides a first stream comprising a catalyst gas to a reactor; a hydrocarbon source that provides a second stream comprising hydrocarbon gas to the reactor; a cooling column that receives a third stream comprising hydrogen, catalyst liquid, solid carbon, optionally catalyst gas, and optionally unreacted hydrocarbon gas from the reactor; and wherein the cooling column has effluent streams that include (a) a fourth stream that comprises hydrogen and optionally catalyst gas and (b) a fifth stream that comprises catalyst liquid.

Clause 30. The system of Clause 29 further comprising: a first separator that receives the fourth stream from the cooling column; wherein the first separator has effluent streams that include (a) a sixth stream comprising 80 vol % or greater hydrogen and (b) a seventh stream comprising the unreacted hydrocarbon gas; and wherein the reactor receives the seventh stream from the first separator.

Clause 31. The system of Clause 29 or Clause 30, wherein the catalyst source evaporator receives the fifth stream from the cooling column.

Clause 32. The system of Clause 29 or Clause 30 or Clause 31 further comprising: a second separator that receives the eighth stream from the cooling column; wherein the second separator has effluent streams that include (a) a ninth stream comprising 80 vol % or greater of the solid carbon and (b) a tenth stream comprising 80 vol % or greater of the catalyst liquid; and wherein the reactor receives the seventh stream from the first separator.

Clause 33. The system of Clause 32, wherein the second separator causes the catalyst liquid to evaporate.

Clause 34. The system of Clause 29 or Clause 30 or Clause 31 or Clause 32 or Clause 33, wherein the second stream passes via heat exchange through the cooling column.

To facilitate a better understanding of the embodiments of the present invention, the following examples of preferred or representative embodiments are given. In no way should the following examples be read to limit, or to define, the scope of the invention.

EXAMPLES

The catalytic activity of liquid metal catalyst to the decomposition of methane to hydrogen and solid carbon was estimated using a bubble column setup. Methane gas was bubbled through molten metal catalyst. The bubble size was estimated based on the bubble rate where at low flow rate individual bubble formation can be observed using rotameters. The bubble rise time is then estimated based on the bubble size and a known relationship between bubble diameter and bubble velocity. The bubble size estimation was then used to derive the catalytic surface area and residence time, which were then used to estimate the reaction rate (or catalytic activity) of liquid metal catalyst.

Figure 4:
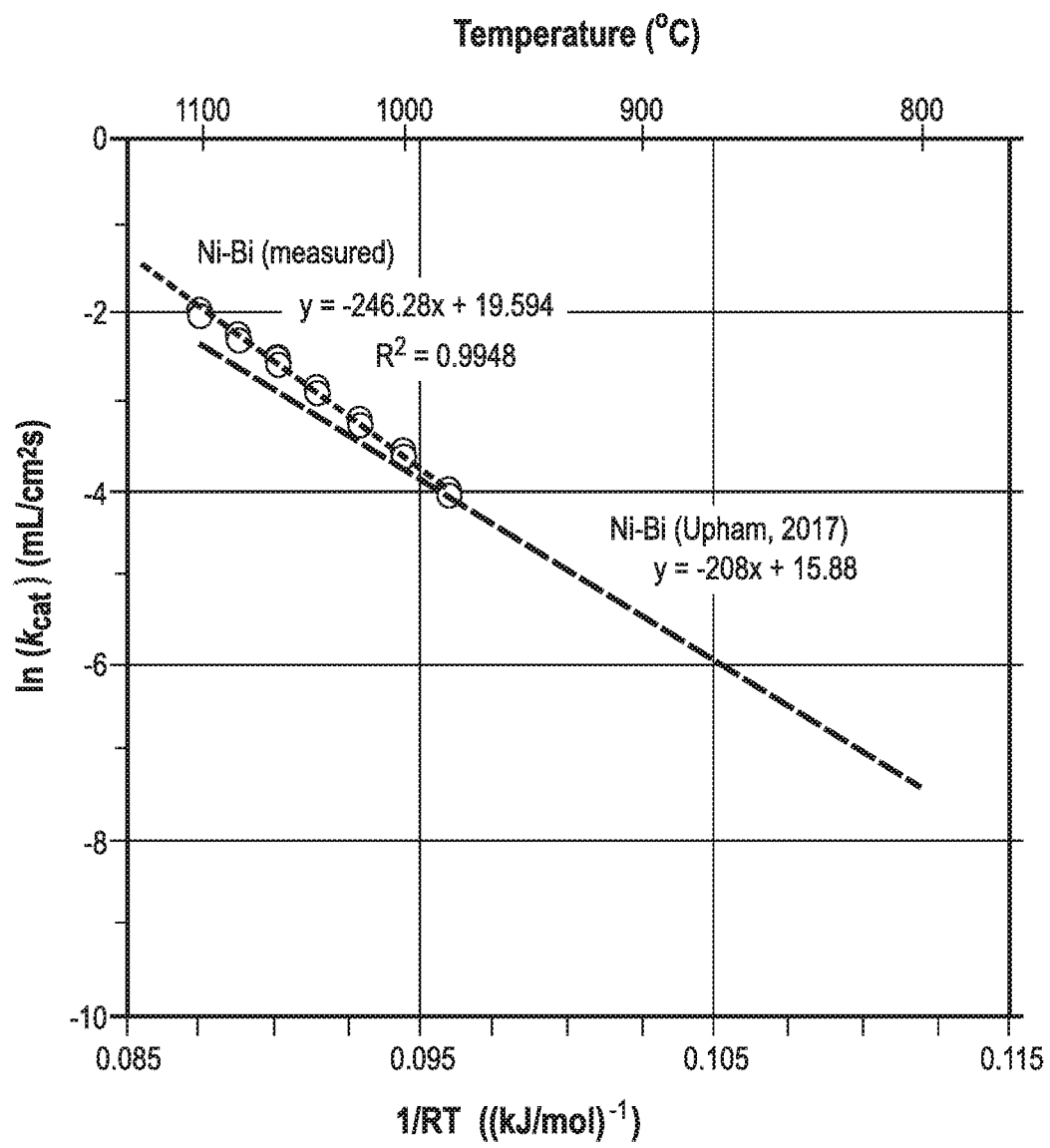
FIG. 4 is a plot of the collected data (circles with dotted trend line) and the known (dashed line) rate constant of the decomposition reaction in the presence of the nickel-bismuth catalyst as a function of temperature.

First, the above methodology was tested using a nickel-bismuth catalyst, which has a known catalytic activity. FIG. 4 is a plot of the collected data (circles with dotted trend line) and the known (dashed line) rate constant of the decomposition reaction in the presence of the nickel-bismuth catalyst as a function of temperature. As illustrated, the agreement in rate constant is very close. Accordingly, the methodology was then applied to liquid zinc.

Figure 5:
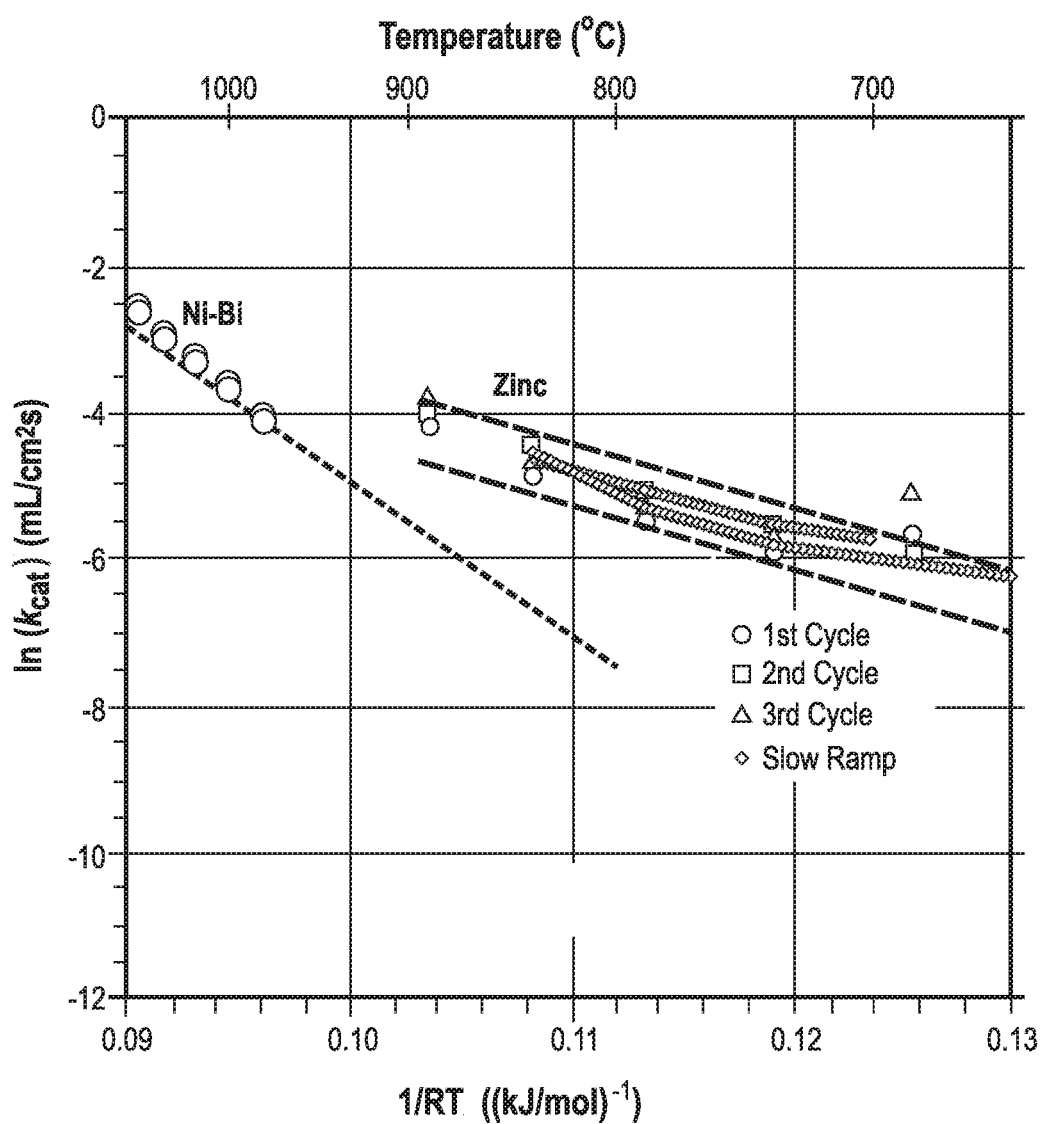
FIG. 5 is a plot of the rate constant of the decomposition reaction in the presence of the nickel-bismuth catalyst or zinc catalyst as a function of temperature.

FIG. 5 is a plot of the rate constant of the decomposition reaction in the presence of the nickel-bismuth catalyst or zinc catalyst as a function of temperature. This illustrates that the zinc has a similar catalytic activity to the nickel-bismuth catalyst at lower temperatures. Further illustrated on the plot is minimum activity needed to make zinc suitable for industrial-scale implementation. As illustrated, zinc surpassed said requirement, which illustrates that zinc is a suitable catalyst for the methods and systems described herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method comprising:
    evaporating a catalyst source to produce a catalyst gas, wherein the catalyst source comprises a catalyst and the evaporation step is performed by a catalyst source evaporator; subsequently
    introducing the catalyst gas into a reactor;
    condensing the catalyst gas in the reactor to produce a catalyst vapor comprising catalyst droplets suspended in a gas phase;

introducing a hydrocarbon gas to the reactor downstream of the catalyst gas introduction to the reactor; and contacting the catalyst vapor with a hydrocarbon gas so as to catalyze a decomposition reaction of the hydrocarbon gas into hydrogen gas and carbon.

2. The method of claim 1 further comprising:

collecting the catalyst droplets to produce a mixture of the carbon and a catalyst liquid; and separating the carbon from the catalyst liquid.

3. The method of claim 2, wherein separating the carbon from the catalyst liquid comprises:

evaporating the catalyst liquid from the carbon.

4. The method of claim 2 further comprising:

recycling the catalyst liquid to the catalyst source for evaporation.

5. The method of claim 1 further comprising:

condensing the catalyst droplets to produce a mixture of the carbon and a catalyst liquid;

recycling the mixture to the catalyst source for evaporation; and separating the carbon from the catalyst source.

6. The method of claim 1, wherein the catalyst gas before condensation is at a temperature of about 5° C. to about 500° C. greater than a boiling point of the catalyst.

7. The method of claim 1, wherein condensing the catalyst gas comprises:

exposing the catalyst gas to the hydrocarbon gas, wherein the hydrocarbon gas is at a temperature below a boiling point of the catalyst.

8. The method of claim 7, wherein the temperature of the hydrocarbon gas is about 5° C. to about 500° C. less than a boiling point of the catalyst.

9. The method of claim 1, wherein the catalyst is a metal.

10. The method of claim 9, wherein the metal has a boiling point of 1,500° C. or less.

11. The method of claim 1, wherein the catalyst is a salt.

12. The method of claim 1, wherein the catalyst is an ionic liquid.

13. The method of claim 1, wherein the catalyst droplets have a diameter of about 5 nm to about 10,000 nm.

14. The method of claim 1, wherein the catalyst droplets have a diameter of about 5 nm to about 150 nm.

15. The method of claim 1, wherein the catalyst vapor comprises the catalyst droplets such that about 60 vol % or less of the catalyst vapor is the catalyst droplets.

16. The method of claim 1, wherein the catalyst vapor has a catalytic areal density of about 1,000 $m^2/m^3$ to about 30,000 $m^2/m^3$.

17. The method of claim 1, wherein the hydrocarbon gas comprises one or more selected from the group consisting of:

a C1 to C20 alkane, a C1 to C20 alkene, a C1 to C20 alkynes, and a C6 to C20 arene.

18. The method of claim 1, wherein the gas phase comprises 0 vol % to about 1 vol % of oxygen-containing compounds that are reactive in the decomposition reaction to produce carbon dioxide.

19. A system comprising:

a catalyst source evaporator coupled to a reactor via a first stream comprising catalyst gas such that the reactor receives the first stream from the catalyst source evaporator;

a hydrocarbon source coupled to the reactor via a second stream comprising hydrocarbon gas such that the reactor receives the second stream from the hydrocarbon source downstream of the first stream;

a cooling column coupled to the reactor via a third stream comprising hydrogen, catalyst liquid, solid carbon, optionally catalyst gas, and optionally unreacted hydrocarbon gas such that the cooling column receives the third stream from the reactor; and wherein the cooling column has effluent streams that include (a) a fourth stream that comprises hydrogen and optionally catalyst gas and (b) a fifth stream that comprises catalyst liquid.

* * * * *